United States Patent
Hou et al.

(10) Patent No.: US 11,374,257 B2
(45) Date of Patent: Jun. 28, 2022

(54) SOFTENED SOLID-STATE ELECTROLYTES FOR LITHIUM ION BATTERIES

(71) Applicant: GM GLOBAL TECHNOLOGY OPERATIONS LLC, Detroit, MI (US)

(72) Inventors: Mengyan Hou, Shanghai (CN); Haijing Liu, Shanghai (CN); Dewen Kong, Shanghai (CN); Yong Lu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 335 days.

(21) Appl. No.: 16/559,075

(22) Filed: Sep. 3, 2019

(65) Prior Publication Data
US 2021/0066746 A1 Mar. 4, 2021

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0068* (2013.01); *H01M 2300/0071* (2013.01)

(58) Field of Classification Search
None
See application file for complete search history.

(56) References Cited

U.S. PATENT DOCUMENTS

2012/0115018 A1* 5/2012 Kawaoka ............ H01M 10/052
429/162
2017/0338522 A1 11/2017 Hu et al.

OTHER PUBLICATIONS

Lau et al., Adv. Energy Mater., 2018, 8, 180093. (Year: 2018).*
Chen et al., Energy Storage Materials, 14 (2018) 58-74. (Year: 2018).*
Han et al., "Interphase Engineering Enabled All-Ceramic Lithium Battery," Joule 2, Mar. 21, 2018, pp. 1-12.
Liu et al., "Enhanced electrochemical performance of bulk type oxide ceramic lithium batteries enabled by interface modification," J. Mater. Chem. A, 2017.
Ni et al., "Room temperature elastic moduli and Vickers hardness of hot-pressed LLZO cubic garnet," J Mater Sci (2012) 47:7978-7985.

* cited by examiner

*Primary Examiner* — Eli S Mekhlin
(74) *Attorney, Agent, or Firm* — Cantor Colburn LLP

(57) ABSTRACT

In an embodiment, a softened solid-state electrolyte, comprises an oxide-based solid-state electrolyte, where at least a portion of the oxide anions in the oxide-based solid-state electrolyte is replaced with a replacement anion. In another embodiment, a softened solid-state electrolyte comprises a sulfide-based solid-state electrolyte, wherein at least a portion of the sulfide anions in the sulfide-based solid-state electrolyte is replaced with the replacement anion. When the replacement anion replaces the oxide anion, the replacement anion has a larger atomic radius than the oxide anion and when the replacement anion replaces the sulfide anion, the replacement anion has a larger atomic radius than the sulfide anion.

16 Claims, 1 Drawing Sheet

SOFTENED SOLID-STATE ELECTROLYTES FOR LITHIUM ION BATTERIES

INTRODUCTION

Lithium ion batteries with high energy density and long cycle life have attracted ever-increasing attention as they are widely used in various applications such as portable devices, electric vehicles, and energy storage systems in power plants. Current lithium ion batteries relying on organic liquid electrolytes present significant problems though with respect to a limited voltage, unstable interphase formation, and poor cycling performance. Moreover, organic liquid electrolytes pose significant concerns with safety issues due to the deleterious effects of lithium dendrite growth and the potential of leakage of liquid electrolytes. In order to circumvent these and other concerns, recent interest has arisen in lithium ion batteries that rely on solid-state electrolytes. While progress has been made on the improvement of ion conductivity in solid-state electrolytes resulting in conductivity values as high as $10^{-2}$ Siemens per centimeter (S/cm) in sulfide-based electrolytes, full cell development faces challenges in developing a stable interface with a small interfacial impedance between the solid-state electrolyte and the electrodes.

Accordingly, it is desirable to provide an improved solid-state electrolyte for use in solid-state batteries.

SUMMARY

In one exemplary embodiment, a softened solid-state electrolyte comprises an oxide-based solid-state electrolyte, where at least a portion of the oxide anions in the oxide-based solid-state electrolyte is replaced with a replacement anion that has a larger atomic radius than the oxide anion.

In addition to one or more of the features described herein, the softened solid-state electrolyte can have a reduced elastic modulus relative to the solid-state electrolyte without the replacement anion.

In addition to one or more of the features described herein, the replacement anion can comprise at least one of $S^{2-}$, $Se^{2-}$, $2Br^-$, or $2I^-$.

In addition to one or more of the features described herein, a molar amount of the replacement anion in the oxide-based solid-state electrolyte can be 1 to 100 mol %, or 1 to 50 mol %, or 5 to 45 mol % based on the total moles of the oxide anion and the replacement anion.

In addition to one or more of the features described herein, the oxide-based solid-state electrolyte can comprise a garnet type electrolyte. The garnet type electrolyte can have the formula $Li_3Ln_3Te_2O_{12}$, where Ln is at least one of Y, Pr, Nd, or Sm—Lu, and at a portion of the oxygen is replaced with the replacement anion. The garnet type electrolyte can have the formula $Li_{3+x}Nd_3Te_{2-x}Sb_xO_{12}$, where x is 0.05 to 1.5, and at least a portion of the oxygen is replaced with the replacement anion. The garnet type electrolyte can have the formula $Li_5La_3M_2O_{12}$, where M is at least one of Nb, Ta, or Sb, and at least a portion of the oxygen is replaced with the replacement anion. The garnet type electrolyte can have the formula $Li_6ALa_2M''_2O_{12}$, where A is at least one of Mg, Ca, Sr, or Ba, M''' is at least one of Nb or Ta, and at least a portion of the oxygen is replaced with the replacement anion. The garnet type electrolyte can have the formula $Li_7La_3M'_2O_{12}$, where M' is at least one of Zr or Sn, and at least a portion of the oxygen is replaced with the replacement anion. The garnet type electrolyte can have the formula $Li_{5+x}La_3(Zr_xA_{2-x})O_{12}$, where A is at least one of Sc, Ti, V, Y, Nb, Hf, Ta, Si, Ga, Ge, and Sn, x satisfies the inequality $1.4 \leq x \leq 2$, and at least a portion of the oxygen is replaced with the replacement anion.

In addition to one or more of the features described herein, the oxide-based solid-state electrolyte can comprise a lithium super ionic conductor type electrolyte. The lithium super ionic conductor type electrolyte can have a formula of at least one of $Li_{14}Zn(GeO_4)_4$, $Li_{3+x}Ge_xV_{1-x}O_4$, or $Li_{3+x}(P_{1-x}Si_x)O_4$; where x is $0<x<1$; and at least a portion of the oxygen is replaced with the replacement anion.

In addition to one or more of the features described herein, the oxide-based solid-state electrolyte can comprise a sodium super ionic conductor type electrolyte. The sodium super ionic conductor type electrolyte can have a formula of at least one of $Na_{1+x}D^{4+}_{2-x}D'^{3+}_x(PO_4)_3$; where D is at least one of Ti, Ge, Sn, Hf, or Zr; D' is Cr, Al, Ga, Sc, Y, In, or La; x is $0 \leq x \leq 2$; and at least a portion of the oxygen is replaced with the replacement anion.

In addition to one or more of the features described herein, the oxide-based solid-state electrolyte can comprise a perovskite type electrolyte. The perovskite type electrolyte can have a formula of at least one of $Li_{3.3}La_{0.56}TiO_3$, $Li_{3x}La_{2/3-x}TiO_3$, or $Li_{0.5}G_{0.5}TiO_3$; where G is at least one of Sm, Nd, Pr, or La; wherein x is $0.045<x<0.125$; and at least a portion of the oxygen is replaced with the replacement anion.

In addition to one or more of the features described herein, the oxide-based solid-state electrolyte can comprise an antiperovskite type electrolyte. The antiperovskite type electrolyte can have a formula of at least one of $Li_3OCl$ or $Li_3OBr$; where at least a portion of the oxygen is replaced with the replacement anion.

In addition to one or more of the features described herein, the softened solid-state electrolyte can comprise at least one of a lithium borate, a lithium silicate, or a lithium aluminate.

In yet another exemplary embodiment, a softened solid-state electrolyte comprises a sulfide-based solid-state electrolyte, where at least a portion of the sulfide anions in the sulfide-based solid-state electrolyte is replaced with a replacement anion that has a larger atomic radius than the sulfide anion.

In addition to one or more of the features described herein, the softened solid-state electrolyte can have a reduced elastic modulus relative to the solid-state electrolyte without the replacement anion.

In addition to one or more of the features described herein, the replacement anion can comprise at least one of $Se^{2-}$, $2Br^-$, or $2I^-$.

In addition to one or more of the features described herein, the replacement anion can comprise $Se^{2-}$.

In addition to one or more of the features described herein, a molar amount of the replacement anion in the sulfide-based solid-state electrolyte can be 1 to 100 mol %, or 1 to 50 mol %, or 5 to 45 mol % based on the total moles of the sulfide anion and the replacement anion.

In addition to one or more of the features described herein, the sulfide-based solid-state electrolyte can comprise the sulfide-based solid-state electrolyte. The sulfide-based solid-state electrolyte can comprise at least one of a crystal type sulfide electrolyte, a glass-ceramic type sulfide electrolyte, or a glass type sulfide electrolyte.

In addition to one or more of the features described herein, the sulfide-based solid-state electrolyte can comprise at least one of $Li_2S$—$PS_5$, $Li_2S$—$P_2S_5$—$Li_2O$, $Li_2S$—$P_2S_5$—$Li_2$—$LiI$. $Li_2S$—$P_2S_5$—$LiX$, $Li_2S$—$SiS_2$, $Li_2S$—$SiS_2$—$LiX$, $Li_2S$—$SiS_2$—$B_2S_3$—$LiI$, $Li_2S$—$SiS_2$—$P_2S_5$—

LiI, Li$_2$S—B$_2$S$_3$, Li$_2$S—P$_2$S—Z$_a$S$_b$, Li$_2$S—GeS$_2$, Li$_2$S—Al$_2$S$_3$, Li$_2$S—As$_2$S$_3$, Li$_2$S—SiS$_2$—Li$_3$PO$_4$, and Li$_2$S—SiS$_2$-Li$_c$MO$_d$; wherein X comprises at least one of Cl, Br or I; Z comprises at least one of Ge, Zn, or Ga; M comprises at least one of P, As, Sb, Si, Ge, B, Al, Ga, or In; a, b, c, and d are positive numbers; and at least a portion of the sulfide anions is replaced with the replacement anion.

In yet another exemplary embodiment, a solid-state battery comprises a positive electrode comprising positive electrode layer and a positive electrode current collector; a negative electrode comprising negative electrode layer and a negative electrode current collector; and a softened solid-state electrolyte of located in between the positive electrode and the negative electrode or as a mixture in the positive electrode or in the negative electrode. The softened solid-state electrolyte can comprise an oxide-based solid-state electrolyte, where at least a portion of the oxide anions in the oxide-based solid-state electrolyte is replaced with a replacement anion. The softened solid-state electrolyte can comprise a sulfide-based solid-state electrolyte, wherein at least a portion of the sulfide anions in the sulfide-based solid-state electrolyte is replaced with the replacement anion. When the replacement anion replaces the oxide anion, the replacement anion has a larger atomic radius than the oxide anion and when the replacement anion replaces the sulfide anion, the replacement anion has a larger atomic radius than the sulfide anion.

In addition to one or more of the features described herein, an interfacial contact between the softened solid-state electrolyte and the electrodes can be increased relative to a solid-state battery comprising the corresponding solid-state electrolyte but without the replacement anion.

In addition to one or more of the features described herein, the battery can be a lithium ion battery.

The above features and advantages, and other features and advantages of the disclosure are readily apparent from the following detailed description when taken in connection with the accompanying drawings and claims.

BRIEF DESCRIPTION OF THE DRAWINGS

Other features, advantages, and details appear, by way of example only, in the following detailed description, the detailed description referring to the drawings, in which.

DETAILED DESCRIPTION

The following description is merely exemplary in nature and is not intended to limit the present disclosure, its application or uses.

One of the primary challenges in batteries comprising a solid-state electrolyte is the lack of good interfacial contact between the solid-state electrolyte and the electrodes, and particularly between the solid-state electrolyte and the positive electrode. While a few approaches have been considered to reduce interfacial impedance between the solid-state electrolyte and the positive electrode, including incorporating a surface coating, a buffer layer, or various additives, improvements are still needed.

It was discovered that by replacing at least a portion of an anion present in a solid-state electrolyte with an anion having an increased radius, the resultant solid-state electrolyte can be softened, having a reduced elastic modulus (for example, at least one of the linear modulus, the shear modulus, or the bulk modulus) relative to the solid-state electrolyte without the replacement anion and the interfacial contact between the softened solid-state electrolyte and the electrodes can be improved.

Figure 1:
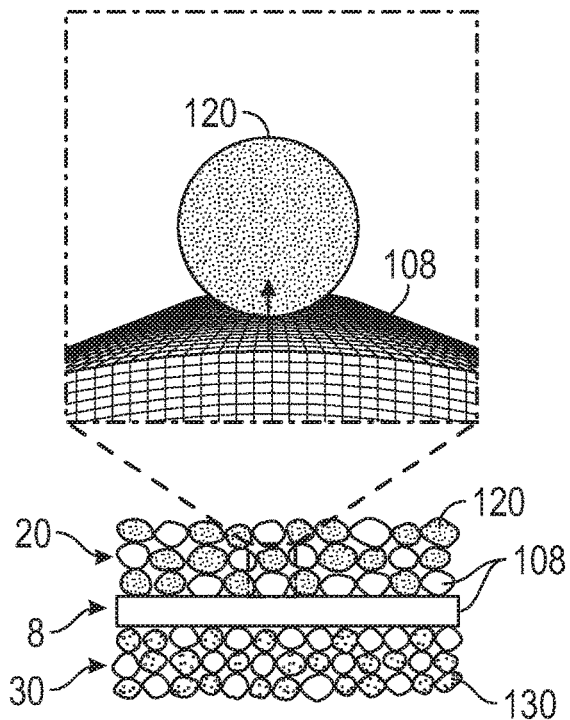
FIG. 1 is an illustration of an article comprising a rigid solid-state electrolyte.
Figure 2:
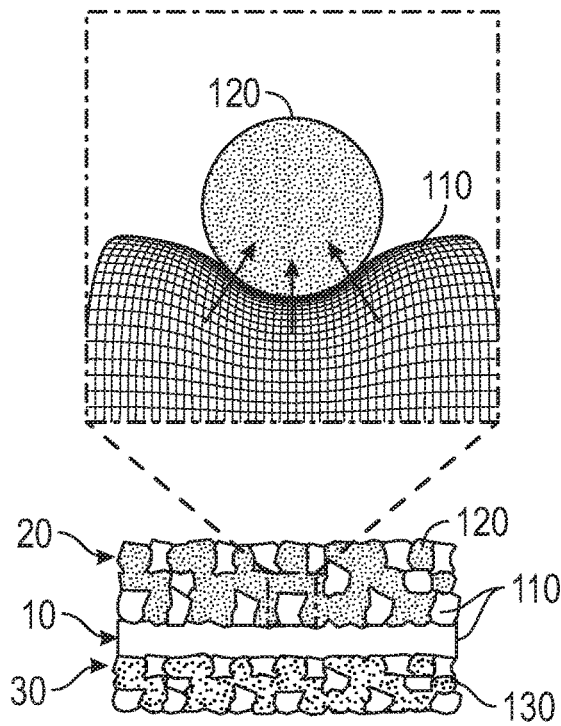
FIG. 2 is an illustration of an article comprising a softened solid-state electrolyte.

FIG. 1 and FIG. 2 provide an illustration of the effect of using a softened solid-state electrolyte. In FIG. 1, a rigid solid-state electrolyte layer 8 is located in between a positive electrode layer 20 and a negative electrode layer 30. The rigid solid-state electrolyte layer 8 comprises a rigid solid-state electrolyte 108, the positive electrode layer 20 comprises an active positive electrode material 120, and the negative electrode layer 30 comprises an active negative electrode material 130. The zoomed-in location illustrated above the article illustrates that the contact between the rigid solid-state electrolyte 108 and the active positive electrode material 120 is limited, resulting in a limited opportunity for the transfer of lithium ions between the two materials, illustrated by only one arrow.

In contrast, FIG. 2 illustrates that instead of the rigid solid-state electrolyte layer 8 and a rigid solid-state electrolyte 108, the article can comprise a softened solid-state electrolyte layer 10 and a softened solid-state electrolyte 110. The zoomed-in location illustrated above the article illustrates that there is an increased contact area between the softened solid-state electrolyte 110 and the active positive electrode material 120 as compared to that of FIG. 1, resulting in an increased opportunity for the transfer of the lithium ions between the two materials that is illustrated by the multiple arrows.

The softened solid-state electrolyte can be prepared by replacing an anion with a replacement anion having a larger radius (herein referred to merely as the replacement anion). For example, if the anion comprises an oxide anion, $O^{2-}$, then the replacement anion can comprise at least one of $S^{2-}$ or $Se^{2-}$. Likewise, if the anion comprises a sulfide anion, $S^{2-}$, then the replacement anion can comprise $Se^{2-}$. Moreover, the replacement anion can comprise two univalent anions for every anion replaced. For example, an oxide anion, $O^{2-}$, or a sulfide anion, $S^{2-}$, can be replaced with two univalent anions such as at least one of $Br^-$ or $I^-$.

It is noted that the terms replacing and replacement as used herein, do not refer to the physical replacement of an anion from a physically existing rigid solid-state electrolyte to form the softened solid-state electrolyte. Instead, the term refers to the theoretical replacement of an anion from a formula describing a rigid solid-state electrolyte with a replacement anion. In other words, the softened solid-state electrolyte is formed without any physical replacement step and the replacement refers to the replacement of an anion in a molecular formula.

In order to illustrate this understanding of the term replacement anion, the following garnet type oxide-based solid-state electrolyte is considered: $Li_5La_3Zr_2O_{12}$ (LLZO). In this example, an amount of the "O" from the formula is replaced with a replacement anion to form a softened LLZO electrolyte having the formula: $Li_5La_3Zr_2O_{12-y}R_y$, wherein R is a replacement anion (for example, $S^{2-}$, $Se^{2-}$, $2Br^-$, or $2I^-$); and y is greater than 0 and less than or equal to 12 ($0<y\leq12$). In other words, the replacement refers to replacing an amount of the "O" in the formula with an amount of the replacement anion. Likewise, for a sulfide-based solid-state electrolyte having the formula $Li_{10}SiP_2S_{12}$, an amount of "S" from the formula is replaced with a replacement anion to form a softened solid-state electrolyte having the formula $Li_{10}SiP_2S_{12-y}R_y$, wherein R is a replacement anion (for example, $Se^{2-}$, $2Br^-$ or $2I^-$); and y is greater than 0 and less than or equal to 12 ($0<y\leq12$).

In considering the crystal structure of the LLZO, LLZO can have a structural polymorph of a cubic high-temperature modification, having a garnet structure composed of a framework of 8-fold coordinated $LaO_8$ dodecahedra and 6-fold coordinated $ZrO_6$ octahedra with $Li^+$ being located at the interstitial sites having tetrahedral, octahedra, and distorted 4-fold coordination that is optionally stabilized by the introduction of a supervalent cation such as $Al^{3+}$ or $Ga^{3+}$. In the softened LLZO electrolyte, at least a portion of the locations of the oxygen anions would be filled with a replacement anion having a larger atomic radius or a larger combined atomic radius.

All or only a portion of the anion can be replaced with the replacement anion. For example, the softened solid-state electrolyte can comprise a molar amount of the replacement anion of 100 molar percent (mol %), or 1 to 100 mol %, or 1 to 50 mol %, or 5 to 45 mol % based on the total moles of the anion and the replacement anion.

The softened solid-state electrolyte can comprise a solid-state electrolyte capable of transporting lithium ions. The softened solid-state electrolyte can comprise at least one of an oxide-based solid-state electrolyte or a sulfide-based solid-state electrolyte. The oxide-based solid-state electrolyte can comprise at least one of a garnet type electrolyte, a lithium super ionic conductor (LISICON) type electrolyte, a sodium super ionic conductor (NASICON) type electrolyte, a perovskite type electrolyte, or an antiperovskite type electrolyte. The oxide-based solid-state electrolyte can comprise at least one of a lithium borate, a lithium silicate, or a lithium aluminate. The sulfide-based solid-state electrolyte can comprise at least one of a crystal type sulfide electrolyte, a glass-ceramic type sulfide electrolyte, or a glass type sulfide electrolyte.

The softened solid-state electrolyte can comprise a garnet type electrolyte. The garnet type electrolyte can comprise at least one of a Li3 phase garnet, a Li5 phase garnet, a Li6 phase garnet, or a Li7 phase garnet. The Li3 phase garnet can have a formula of at least one of $Li_3Ln_3Te_2O_{12}$ or $Li_{3+x}Nd_3Te_{2-x}Sb_xO_{12}$; wherein Ln is at least one of Y, Pr, Nd, or Sm—Lu; x is 0.05 to 1.5; and at least a portion of the oxygen is replaced with a replacement anion. The Li5 phase garnet can have a formula of $Li_5La_3M_2O_{12}$; wherein M is at least one of Nb, Ta, or $S_b$; and at least a portion of the oxygen is replaced with a replacement anion. The Li6 phase garnet can have a formula of $Li_6ALa_2M''_2O_{12}$; wherein A is at least one of Mg, Ca, Sr, or Ba; M" is at least one of Nb or Ta; and at least a portion of the oxygen is replaced with a replacement anion. The Li7 phase garnet can have a formula of $Li_7La_3M'_2O_{12}$; wherein M' is at least one of Zr or Sn; and at least a portion of the oxygen is replaced with a replacement anion. The garnet type electrolyte can have the formula $Li_{5+x}La_3(Zr_xA_{2-x})O_{12}$; wherein A is at least one of Sc, Ti, V, Y, Nb, Hf, Ta, Si, Ga, Ge, and Sn; x satisfies the inequality $1.4\leq x\leq2$; and at least a portion of the oxygen is replaced with a replacement anion.

The softened solid-state electrolyte can comprise a lithium super ionic conductor type electrolyte. The lithium super ionic conductor can have the formula of at least one of $Li_{14}Zn(GeO_4)_4$, $Li_{3+x}Ge_xV_{1-x}O_4$, or $Li_{3+x}(P_{1-x}Si_x)O_4$; wherein x is $0<x<1$; and at least a portion of the oxygen is replaced with a replacement anion.

The solid-state electrolyte can comprise a sodium super ionic conductor type electrolyte. The sodium super ionic conductor can have the formula of at least one of $Na_{1+x}D^{4+}_{2-x}D'^{3+}_x(PO_4)_3$; wherein D is at least one of Ti, Ge, Sn, Hf, or Zr; D' is at least one of Cr, Al, Ga, Sc, Y, In, or La; x is $0\leq x\leq2$; and at least a portion of the oxygen is replaced with a replacement anion. Examples of the sodium super ionic conductor comprise $Na_{1+x}Al_xGe_{2-x}(PO_4)_3$ (LAGP), $Na_{1+x}Ti_{2-x}Al_x(PO_4)_3$ (LTAP), or $NaTi_{0.5}Zr_{1.5}(PO_4)_3$; wherein x is $0\leq x\leq0.5$; and at least a portion of the oxygen is replaced with a replacement anion.

The softened solid-state electrolyte can comprise a perovskite type electrolyte. The perovskite type electrolyte can have the formula of at least one of $Li_{3.3}La_{0.56}TiO_3$, $Li_{3x}La_{2/3-x}TiO_3$, or $Li_{0.5}G_{0.5}TiO_3$; wherein G is at least one of Sm, Nd, Pr, or La; wherein x is $0.045<x<0.125$; and at least a portion of the oxygen is replaced with a replacement anion.

The softened solid-state electrolyte can comprise an antiperovskite type electrolyte. The antiperovskite type electrolyte can have the formula of at least one of $Li_3OCl$ or $Li_3OBr$; wherein at least a portion of the oxygen is replaced with a replacement anion.

The softened solid-state electrolyte can comprise a sulfide-based solid-state electrolyte. The sulfide-based solid-state electrolyte can comprise at least one of a crystal type sulfide electrolyte, a glass-ceramic type sulfide electrolyte, or a glass type sulfide electrolyte.

The sulfide-based solid-state electrolyte can comprise at least one of $Li_2S$—$PS_5$, $Li_2S$—$P_2S_5$—$Li_2$, $Li_2S$—$P_2S_5$—$Li_2$—LiI, $Li_2S$—$P_2S_5$—LiX, $Li_2S$—$SiS_2$, $Li_2S$—$SiS_2$—LiX, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_aS_b$, $Li_2S$—$GeS_2$, $Li_2S$—$Al_2S_3$, $Li_2S$—$As_2S_3$, $Li_2S$—$SiS_2$—$Li_3PO_4$, and $Li_2S$—$SiS_2$-$Li_cMO_d$; wherein X comprises at least one of Cl, Br or I; Z comprises at least one of Ge, Zn, or Ga; M comprises at least one of P, As, $S_b$, Si, Ge, B, Al, Ga, or In; and a, b, c, and d are positive numbers. It is noted that the description of, for example, $Li_2S$—$P_2S_5$, signifies the electrolyte material is obtained by using a raw material composition containing $Li_2S$ and $P_2S_5$, and other descriptions signify similarly.

The sulfide-based solid-state electrolyte can comprise at least one of lithium argyrodite $L_6PS_5Cl$, $L_6PS_5Br$, $Li_6PS_5I$, $Li_7P_2S_8I$, thio-LISICON $Li_{10}GeP_2S_{12}$ (LGPS), $Li_{10.35}Ge_{1.35}P_{1.65}S_{12}$, $Li_{3.25}Ge_{0.25}P_{0.75}S$, $Li_{10}SnP_2S_{12}$, $Li_{10}SiP_2S_{12}$, or $Li_{9.54}Si_{1.74}P_{1.44}S_{11.7}Cl_{0.3}$; wherein at least a portion of the sulfide is replaced with a replacement anion.

The softened solid-state electrolyte can comprise at least one of $70Li_2S.30P_2S_5$, $70Li_2S.29P_2S_5.1P_2S_3$, $70Li_2S.29P_2S_5.1Li_3PO_4$, $75Li_2S.24P_2S_5.1P_2O_5$, $Li_{3.25}P_{0.95}S_4$, $Li_{9.6}P_3S_2$, $Li_7P_3S_{11}$, $Li_3PO_4$—$Li_2S$—$SiS_2$, or $Li_2S$—$GeS_2$—$P_2S_5$, wherein at least a portion of the sulfide anions is replaced with a replacement anion.

The softened solid-state electrolyte can comprise at least one of $70Li_2S.30P_2S_5$, $80Li_2S.20P_2S_5$, or $75Li_2S.25P_2S_5$; wherein at least a portion of the sulfide anions is replaced with a replacement anion.

Figure 3:
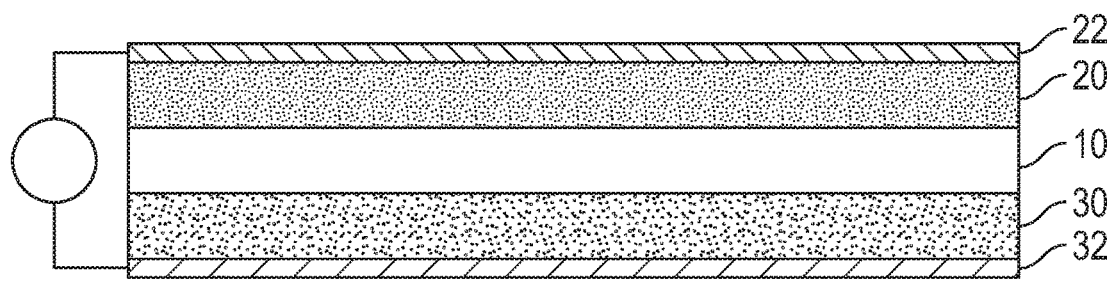
FIG. 3 is an illustration of a lithium ion battery comprising a softened solid-state electrolyte.

The solid-state electrolyte can be located in between two electrodes, for example, a negative electrode and a positive electrode, both of which can be capable of occluding and releasing lithium ions. For example, FIG. 2 and FIG. 3 illustrate an article having a softened solid-state electrolyte layer 10 located in between a positive electrode layer 20 and a negative electrode layer 30. The softened solid-state electrolyte layer 10 can be in direct physical contact with at least one of the active positive electrode layer 20 or the negative electrode layer 30. An interfacial layer can be located between the softened solid-state electrolyte layer 10 and at least one of the active positive electrode layer 20 or the negative electrode layer 30.

The positive electrode layer 20 can comprise a lithium oxide material and a binder material. The lithium oxide material can be an Li—X—O material, wherein X comprises at least one of Ni, Co, Mn, Ti, Al, V, W, Ru, or B. For example, the lithium oxide material can comprise at least one of $Li[Ni_{0.5}Co_{0.2}Mn_{0.3}]O_2$, $Li[Ni_{0.6}Co_{0.2}Mn_{0.2}]O_2$, $Li[Ni_{0.7}Co_{0.1}Mn_{0.2}]O_2$, $LiCoO_2$, $Li[Ni_{0.8}Co_{0.1}Mn_{0.1}]O_2$, $LiMn_2O_4$, or $LiNi_{0.85}Co_{0.1}Al_{0.05}O_2$. A loading of the lithium oxide in the positive electrode layer 20 can be 0.2 to 30 milligrams per centimeter squared, or 0.5 to 30 milligrams per centimeter squared.

The binder can comprise at least one of a fluoropolymer (for example, at least one of a polytetrafluoroethylene or poly(vinylidene fluoride)), a rubber (for example, an ethylene propylene diene M-class rubber (EPDM) or a styrene-butadiene rubber), a poly(amic acid), a polyimide, a polyamide, a phenolic resin, an epoxy resin, a cellulose-based binder, poly(acrylic acid), a polyacrylonitrile, or an alginate-based binder. The binder can be present in an amount of 0 to 40 weight percent, or 1 to 30 weight percent based on the total weight of the positive electrode layer 20.

The lithium oxide material can comprise a coating, for example, a layer of an Li—Ti—O precursor can be coated on lithium oxide particles, the coating layer can then be annealed to form a spinel (for example, $Li[Ti_{0.1}Mn_{0.9}]_2O_4$), or a $LiTi_2(PO_4)_3$ coating layer on the surface of the lithium oxide particles. Some other coating materials including could also be used for surface modification.

The positive electrode layer 20 can comprise at least one of an electrically conductive filler, for example, at least one of carbon, copper, nickel, or stainless steel. The electrically conductive filler can comprise a least one of graphite, graphene, carbon fibers, carbon nanotubes, carbon black, or hard carbon. The positive electrode layer 20 can comprise 0.1 to 20 wt % or 5 to 10 wt % of the additive based on the total weight of the positive electrode layer 20.

The negative electrode layer 30 can comprise metallic lithium, a carbonaceous material capable of releasing and occluding lithium ions, a lithium-containing alloy (for example, LiIn or Li—Zn), an indium-containing alloy (for example, In—Sb or Cu—In—Sn), an oxide (for example, $Li_4Ti_5O_{12}$ or $WO_2$), a lanthanum-nickel compound (for example, $La_3Ni_2Sn_7$), or a conductive polymer. The negative electrode layer 30 can comprise at least one of lithium or carbon (for example, graphite). The negative electrode layer 30 can comprise lithium or a lithium alloy (for example, a lithium indium alloy). The negative electrode layer 30 can comprise a lithium foil. The carbonaceous material can comprise at least one of coke, a glassy carbon, graphite, a non-graphitizable carbon, a pyrolytic carbon, or carbon fibers. In particular, the negative electrode active material can comprise graphite such as synthetic or natural graphite as such graphite has an operating potential close to that of metallic lithium. In this manner, the charge and discharge can be performed at a high operating voltage, self-discharge, and irreversible capacity can be reduced during charge.

A positive electrode current collector 22 can be located on a side of the positive electrode layer 20 opposite the softened solid-state electrolyte layer 10. A negative electrode current collector 32 can be located on a side of the negative electrode layer 30 opposite the softened solid-state electrolyte layer 10. The positive electrode current collector 22 and the negative electrode current collector 32 can each independently comprise stainless steel, for example, a stainless steel plate. The positive electrode current collector 22 can comprise a metal, for example, gold and the negative electrode current collector 32 can comprise stainless steel.

The softened solid-state electrolyte can be prepared by aerobic annealing of a mixture comprising the respective precursors. For example, the softened solid-state electrolyte can be formed by forming a mixture comprising the softened solid-state electrolyte precursors such that the mixture has the desired stoichiometric ratios of the respective elements, mixing the precursors in an optional solvent, and calcining the mixed precursors in air to form the softened solid-state electrolyte. The mixing can comprise ball mixing.

The softened solid-state electrolyte layer 10 can be formed from the softened solid-state electrolyte. At least one of the positive electrode materials or the negative electrode materials can be deposited onto the softened solid-state electrolyte layer 10, for example, using a vapor phase process (for example, pulse laser deposition (PLD), sputtering, vapor deposition, or chemical vapor deposition (CVD) including metal-organic chemical vapor deposition (MOCVD)). At least one of the respective layers can be formed or deposited using a solid phase process (for example, a sol-gel process, a doctor blade process, a screen printing process, a slurry casting process, or powder pressing). The softened solid-state electrolyte layer 10 and the positive electrode layer 20 can be formed simultaneously. For example, the softened solid-state electrolyte can be deposited on a positive electrode material and the materials can be co-sintered. Conversely, the positive electrode material (for example, in the form of a slurry) can be cast onto the softened solid-state electrolyte and the materials can be co-sintered.

After one or more of the respective layers are formed, the layer(s) can be sintered. Multiple sintering steps can be performed, for example, the positive electrode layer 20 and the softened electrolyte layer 10 can be layered and then sintered; and the negative electrode layer 30 can be layered onto the softened electrolyte layer 10 on the side opposite of the positive electrode layer 20 and the layers can be sintered. Each sintering step independently can occur at a temperature of 550 to 750 degrees Celsius (° C.). Each sintering step independently can occur for 30 minutes to 3 hours, or 1 to 2 hours.

The article for use in a solid-state lithium ion battery can be formed by laminating under pressure an article comprising the positive electrode layer 20, the softened solid-state electrolyte layer 10, and the negative electrode layer 30 to form a laminate. The positive electrode current collector 22 and the negative electrode current collector 32 can then be press-welded onto the outer surfaces of the article (for example, the laminate if previously laminated). The press-welding can enhance the interfacial contact between the respective layers. The press-welding can occur at a temperature of 150 to 250° C. The press-welding can occur for 0.5 to 2 hours.

The article can form a unit cell of a solid-state lithium ion battery. The solid-state lithium ion battery can be rechargeable or non-rechargeable. A load or a charger can be electrically connected to the negative electrode 30 and the positive electrode 20 via the current collectors in a discharge configuration or a charging configuration. A plurality of unit cells can be connected in series. The plurality of unit cells can be housed in an airtight container to form a battery assembly. The battery assembly can form a power supply for an electric vehicle. Examples of the electric vehicles include battery electric vehicles powered by batteries only, hybrid electric vehicles powered by internal combustion engines and motors, or fuel-cell electric vehicles powered by fuel cells. The battery can be used in a vehicle, for example, located in the front, middle, or rear of the vehicle. The battery can be coupled to the bottom of the vehicle. When used in a vehicle, the battery can be a lithium-ion battery, for example, for use as a battery for a vehicle with a hybrid drive or a fuel cell vehicle.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" do not denote a limitation of quantity, but rather denote the presence of at least one of the referenced item. The term "or" means "and/or" unless clearly indicated otherwise by context.

Reference throughout the specification to "a feature", "an embodiment", "another embodiment", "some embodiments", and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments. The endpoints of all ranges directed to the same component or property are inclusive of the endpoints, are independently combinable, and include all intermediate points and ranges. For example, a range of "5 to 20 millimeters" is inclusive of the endpoints and all intermediate values of the ranges of such as 10 to 23 millimeters, etc.). The term "at least one of" means that the list is inclusive of each element individually, as well as combinations of two or more elements of the list, and combinations of at least one element of the list with like elements not named. Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A softened solid-state electrolyte, comprising:
   an oxide-based solid-state electrolyte, wherein a portion of the oxide anions in the oxide-based solid-state electrolyte is replaced with a replacement anion that has a larger atomic radius than the oxide anion;
   wherein the replacement anion comprises at least one of $S^{2-}$, $Se^{2-}$, $2Br^-$, or $2I^-$; and
   wherein a molar amount of the replacement anion in the softened solid-state electrolyte is 5 to 45 mol % based on the total moles of the oxide anion and the replacement anion.

2. The softened solid-state electrolyte of claim 1, wherein the softened solid-state electrolyte has a reduced elastic modulus relative to the solid-state electrolyte without the replacement anion.

3. The softened solid-state electrolyte of claim 1, wherein the oxide-based solid-state electrolyte comprises a garnet type electrolyte, wherein the garnet type electrolyte optionally has a formula of at least one of:
   $Li_3Ln_3Te_2O_{12}$, wherein Ln is at least one of Y, Pr, Nd, or Sm—Lu, and at least a portion of the oxygen is replaced with the replacement anion;
   $Li_{3+x}Nd_3Te_{2-x}Sb_xO_{12}$, wherein x is 0.05 to 1.5, and at least a portion of the oxygen is replaced with the replacement anion;
   $Li_5La_3M_2O_{12}$, wherein M is at least one of Nb, Ta, or Sb, and at least a portion of the oxygen is replaced with the replacement anion;
   $Li_6ALa_2M''_2O_{12}$, wherein A is at least one of Mg, Ca, Sr, or Ba, M'' is at least one of Nb or Ta, and at least a portion of the oxygen is replaced with the replacement anion;
   $Li_7La_3M'_2O_{12}$, wherein M' is at least one of Zr or Sn, and at least a portion of the oxygen is replaced with the replacement anion; or
   $Li_{5+x}La_3(Zr_xA_{2-x})O_{12}$, wherein A is at least one of Sc, Ti, V, Y, Nb, Hf, Ta, Si, Ga, Ge, and Sn, x satisfies the inequality $1.4 \leq x \leq 2$, and at least a portion of the oxygen is replaced with the replacement anion.

4. The softened solid-state electrolyte of claim 1, wherein the oxide-based solid-state electrolyte comprises a lithium super ionic conductor type electrolyte, wherein the lithium super ionic conductor type electrolyte optionally has a formula of at least one of $Li_{14}Zn(GeO_4)_4$, $Li_{3+x}Ge_xV_{1-x}O_4$; wherein x is $0<x<1$; and at least a portion of the oxygen is replaced with the replacement anion.

5. The softened solid-state electrolyte of claim 1, wherein the oxide-based solid-state electrolyte comprises a sodium super ionic conductor type electrolyte, wherein the sodium super ionic conductor type electrolyte optionally has a formula of at least one of $Na_{1+x}D^{4+}_{2-x}D'^{3+}_x(PO_4)_3$; wherein D is at least one of Ti, Ge, Sn, Hf, or Zr; D' is Cr, Al, Ga, Sc, Y, In, or La; x is $0 \leq x \leq 2$; and at least a portion of the oxygen is replaced with the replacement anion.

6. The softened solid-state electrolyte of claim 1, wherein the oxide-based solid-state electrolyte comprises a perovskite type electrolyte, wherein the perovskite type electrolyte optionally has a formula of at least one of $Li_{3.3}La_{0.56}TiO_3$, $Li_{3x}La_{2/3-x}TiO_3$, or $Li_{0.5}G_{0.5}TiO_3$; wherein G is at least one of Sm, Nd, Pr, or La; wherein x is $0.045<x<0.125$; and at least a portion of the oxygen is replaced with the replacement anion.

7. The softened solid-state electrolyte of claim 1, wherein the oxide-based solid-state electrolyte comprises an antiperovskite type electrolyte, wherein the antiperovskite type electrolyte optionally has a formula of at least one of $Li_3OCl$ or $Li_3OBr$; wherein at least a portion of the oxygen is replaced with the replacement anion.

8. The softened solid-state electrolyte of claim 1, wherein the softened solid-state electrolyte comprises at least one of a lithium borate, a lithium silicate, or a lithium aluminate.

9. A softened solid-state electrolyte, comprising:
   a sulfide-based solid-state electrolyte, wherein a portion of the sulfide anions in the sulfide-based solid-state electrolyte is replaced with a replacement anion that has a larger atomic radius than the sulfide anion;
   wherein the replacement anion comprises at least one of $Se^{2-}$, $2Br^-$ or $2I^-$; and wherein a molar amount of the replacement anion in the softened solid-state electrolyte is 5 to 45 mol % based on the total moles of the oxide anion and the replacement anion.

10. The softened solid-state electrolyte of claim 9, wherein the softened solid-state electrolyte has a reduced elastic modulus relative to the solid-state electrolyte without the replacement anion.

11. The softened solid-state electrolyte of claim 9, wherein the replacement anion comprises $Se^{2-}$.

12. The softened solid-state electrolyte of claim 9, wherein the sulfide-based solid-state electrolyte comprises at least one of a crystal type sulfide electrolyte, a glass-ceramic type sulfide electrolyte, or a glass type sulfide electrolyte.

13. The softened solid-state electrolyte of claim 9, wherein the sulfide-based solid-state electrolyte comprises at least one of $Li_2S$—$PS_5$, $Li_2S$—$P_2S_5$—$Li_2$, $Li_2S$—$P_2S_5$—$Li_2$—$LiI$, $Li_2S$—$P_2S_5$—$LiX$, $Li_2S$—$SiS_2$, $Li_2S$—$SiS_2$—$LiX$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_aS_b$, $Li_2S$—$GeS_2$, $Li_2S$—$Al_2S_3$, $Li_2S$—$As_2S_3$, $Li_2S$—$SiS_2$—$Li_3PO_4$, and $Li_2S$—$SiS_2$-$Li_cMO_d$; wherein X comprises at least one of Cl, Br or I; Z comprises at least one of Ge, Zn, or Ga; M comprises at least one of P, As, Sb, Si, Ge, B, Al, Ga, or In; a, b, c, and d are positive numbers; and at least a portion of the sulfide anions is replaced with the replacement anion.

14. A solid-state battery, comprising:
a positive electrode comprising a positive electrode layer and a positive electrode current collector;
a negative electrode comprising a negative electrode layer and a negative electrode current collector; and
a softened solid-state electrolyte located in between the positive electrode and the negative electrode or as a mixture in the positive electrode or in the negative electrode;
wherein the softened solid-state electrolyte comprises at least one of an oxide-based solid-state electrolyte or a sulfide-based solid-state electrolyte, wherein a portion of the oxide anions in the oxide-based solid-state electrolyte is replaced with a replacement anion comprising at least one of $Se^{2-}$, $2Br^-$ or $2I^-$, wherein a portion of the sulfide anions in the sulfide-based solid-state electrolyte is replaced with the replacement anion;
wherein when the replacement anion replaces the oxide anion, the replacement anion has a larger atomic radius than the oxide anion and when the replacement anion replaces the sulfide anion, the replacement anion has a larger atomic radius than the sulfide anion; and
wherein a molar amount of the replacement anion in the softened solid-state electrolyte is 5 to 45 mol % based on the total moles of the oxide anion and the replacement anion.

15. The solid-state battery of claim 14, wherein an interfacial contact between the softened solid-state electrolyte and the electrodes is increased relative to a solid-state battery comprising the corresponding solid-state electrolyte but without the replacement anion.

16. The solid-state battery of claim 14, wherein the battery is a lithium ion battery.

* * * * *